M. D. LUEHRS.
SCREW-SWAGING MACHINES.
No. 194,875. Patented Sept. 4, 1877.
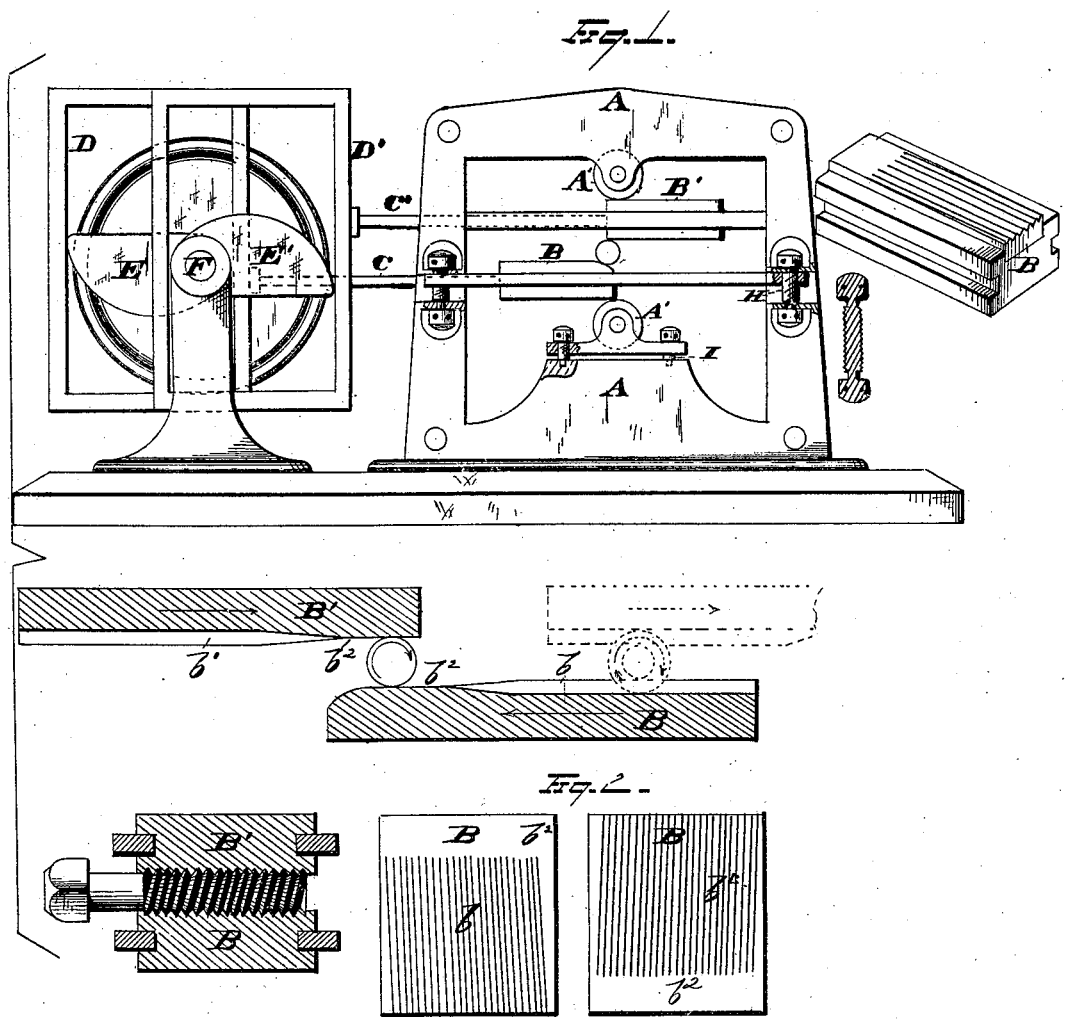
WITNESSES
INVENTOR

UNITED STATES PATENT OFFICE.

MICHEL D. LUEHRS, OF CLEVELAND, OHIO.

IMPROVEMENT IN SCREW-SWAGING MACHINES.

Specification forming part of Letters Patent No. 194,875, dated September 4, 1877; application filed April 27, 1877.

*To all whom it may concern:*

Be it known that I, MICHEL D. LUEHRS, of Cleveland, in the county of Cuyahoga and State of Ohio, have invented certain new and useful Improvements in Machinery for Rolling Threads upon Bolts, &c.; and I do hereby declare the following to be a full, clear, and exact description of the invention, such as will enable others skilled in the art to which it pertains to make and use it, reference being had to the accompanying drawings, which form part of this specification.

My invention relates to machinery for rolling threads upon bolts, set-screws, &c.; and consists in two surfaces or beds with parallel grooves in each bed, between which the bolt is rolled by the relative movement of one bed over the other, whereby the grooves impress the threads upon the interposed bolts, in combination with friction-rollers supporting the said beds, and receiving the strain imposed upon them.

In the drawings, Figure 1 is a view in elevation of a machine embodying my invention. Fig. 2 are plan views of the working faces of the two grooved plates.

A is any suitable frame-work. B B' are the two grooved plates attached, respectively, to the connection-rods C C', which terminate in yokes D D', which are driven in opposite directions by the cams E E' on the drive-shaft F.

A' are friction-rollers, so located as to receive and support the strain upon the plates B B'. The plates B B' are grooved, respectively, with grooves $b$ $b^1$. These grooves are given an angle to the line of direction in which the plates move corresponding to the desired pitch to be given to the thread.

The operation of the device is as follows: The plates being in the position shown in Fig. 1, the bolt is inserted, as there shown at G; it is immediately grasped between the plates B B', and as the plate B is moved in one direction while the plate B' is moved in the opposite direction, the bolt is rolled substantially about its own axis, and the plates impress the threads upon the bolt by means of the grooves $b$ $b^1$.

It will be seen that this construction holds the bolt constantly between the abutments c friction-rollers A', and the plates are thereb firmly held at their work. The plate B soo passes so far as to permit the bolt to dro down complete. It is apparent that if the bol be inserted between the plates, and it is one grasped by the grooves, it can no longer drav out longitudinally. For this reason the bol should be of such a size that it shall not quit fill the space between the threads of the lowel plate and the threads of the upper plate, sc that when the grooves act upon it there may be some space left into which the metal displayed can expand.

In order to insure a bolt of the proper relative size, I prefer to form the portions $b^2$ of the plates smooth, the office of these smooth portions being to roll the bolt down to the proper diameter if it should happen to vary therefrom. The construction of these plates with their grooves and smooth portions relatively to the bolt is indicated more clearly in the sectional views in Fig. 1.

In order to adapt the machine to roll threads upon different sizes of bolts, one of the plates—as, for instance, B—and the adjacent friction-roller should be made vertically adjustable. Such adjusting mechanism may be of any suitable nature, and forms no part of my invention; but the mechanism shown at H and I is an example; but it may be accomplished without these adjustments by making separate dies to be inserted upon the plates B B', and making these dies of the proper thickness to correspond with the given diameter of the bolt to be inserted between them, substantially as shown in the separate view at the right in Fig. 1. It should also be understood that the invention should be limited to no particular means for driving the plates B B', but that any suitable mechanism may be employed, the yokes D D' and the cams E E' being employed simply to demonstrate the invention. It is also apparent that one of the plates may be stationary, and the threads be formed by sliding the other plate over it upon the interposed bolt.

For larger threads, or for threads with a greater pitch, there should be provided plates or grooved working-faces, the grooves of which d correspond with the size of the thread he desired pitch, and these may be in- ced in place of the plates B B' in any ble manner.

hat I claim is— e grooved plates A B, made with the th surfaces $b^2$, the same constituting s having respective flat portions adapted ll the bar to an exact proper diameter, having a portion of each groove extend- partly above and partly below these flat surfaces, whereby the parts of the bar grasped between the projections or ribs are expanded into the bottoms of the grooves, substantially as set forth.

In testimony whereof I have signed my name to this specification in the presence of two subscribing witnesses.

MICHEL D. LUEHRS.

Witnesses:
 FRANCIS TOUMEY,
 W. E. DONNELLY.